Patented July 6, 1926.

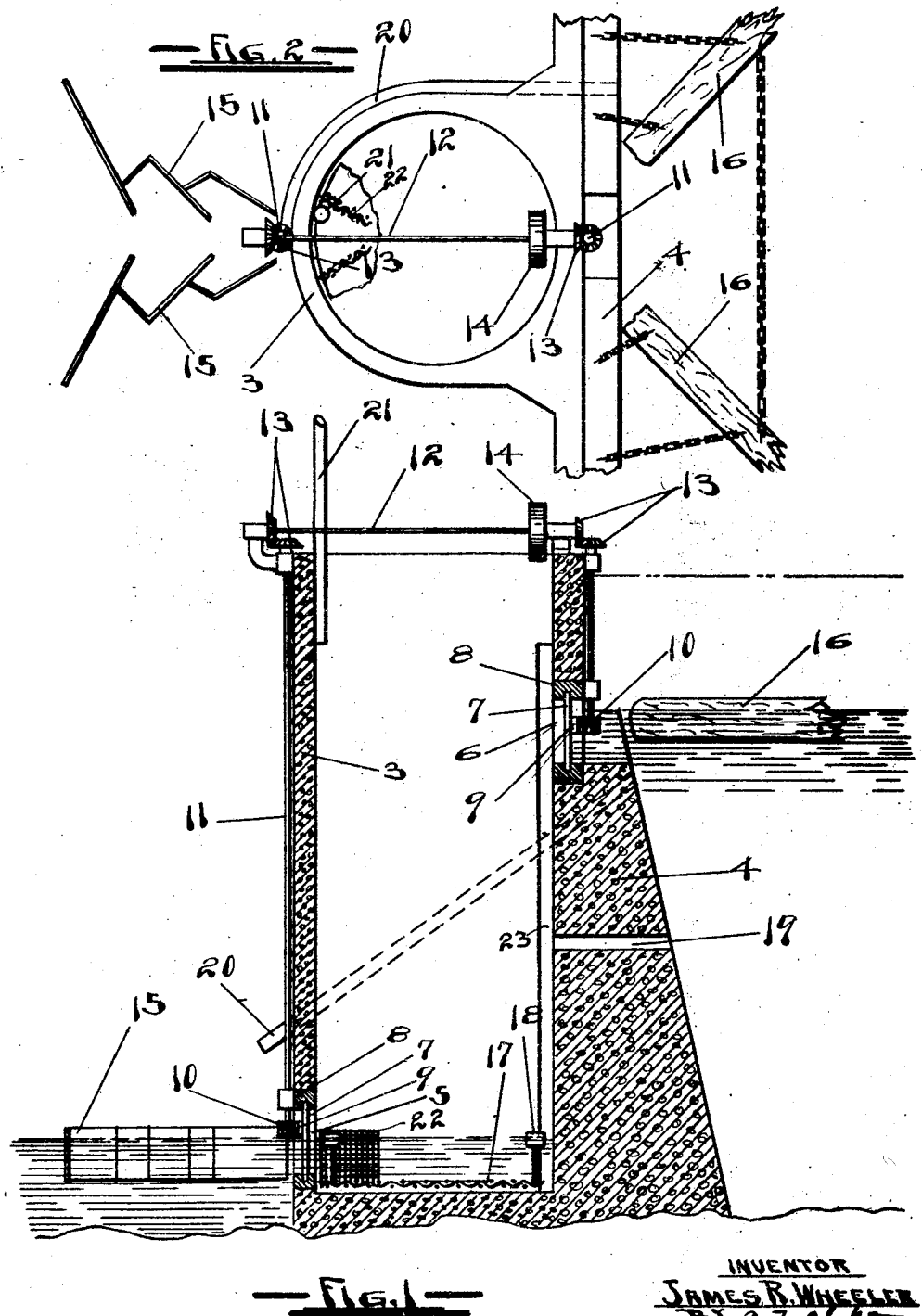

1,591,450

UNITED STATES PATENT OFFICE.

JAMES R. WHEELER, OF WINCHESTER, OREGON.

FISH ELEVATOR.

Application filed December 16, 1924. Serial No. 756,261.

My invention relates to devices for raising fish over dams and other obstructions in rivers and streams, the object being to provide a device that will elevate the fish without damage or handling. I accomplish this object by means of the construction illustrated in the accompanying drawing, which is a part of this application for Letters Patent, like characters of reference indicating like parts throughout the several views thereof, and in which:—

Fig. 1 is a sectional elevation of my device, and Fig. 2 is a plan view thereof.

A vertical passageway is provided through which, by means of suitable gates, water is made to rise or fall to the levels respectively of the water at the top or bottom of the dam or obstruction. Such passageway may be constructed as may seem best, that illustrated being cylindrical in form, having a shell 3 of concrete cast integral with the dam 4. At the bottom of the shell 3 is provided an opening 5 to allow the water from the lower part of the stream to enter the passageway, and at the top of the dam 4 a similar opening 6 is provided to allow the water from the upper part of the stream to enter the passageway.

Each of these openings is controlled by gates of suitable construction, those shown in the drawing being gates 7 slidable in frames 8 set into the shell 3. When the lower gate is open water flows into the passageway until it is at the level of the water in the lower part of the stream, and fish then may enter the passageway. When sufficient fish have entered the passageway the lower gate is closed and the upper gate opened, whereupon the water runs into the passageway from the upper part of the stream, filling the passageway until the level of water therein is at the level of the water in the upper part of the stream, whereupon the fish may enter the upper part of the stream. When the fish have entered the upper part of the stream the upper gate is closed and the lower gate opened, and the water flows from the passageway through the lower gate until it is again at the level of the water in the power part of the stream.

To operate the gates simultaneously, opening one while closing the other, I provide rack teeth 9 upon the gates engaging pinions 10 upon shafts 11, which shafts are geared to a shaft 12 by bevel gears 13. A pulley 14 is secured upon shaft 12 upon which a belt may be mounted from suitable mechanism to rotate the shaft 12, which mechanism is no part of my invention, and is not illustrated in the drawing.

To prevent the fish that have entered the passageway through the lower gate from leaving again a fish trap 15 may be provided at the entrance to the passageway opposite the opening 5. Also to guide fish into the upper opening 6 floating guides 16 may be provided and moored in position by chains as shown in Fig. 2.

In order to assure the elevation of all fish within the passageway I provide a grate like basket 17 of such size as to nearly touch the sides of the passageway, which basket is supported upon suitable floats 18. Thus the fish are retained near the surface of the water within the passageway as they are raised to the upper opening therein.

Since the natural guide of the fish is falling water, I provide such at suitable places as follows: an opening 19 is made in the dam through which water is conducted into the passageway and allowed to fall therein; a pipe 20 conducts water from the stream above the dam around the outside of the shell 3 and discharges it in front of the opening 5 above the trap 15; a pipe 21 leads into the top of the passageway opposite the opening 6 through which pipe water may be discharged into the passageway from a suitable pump, such pump not being shown in the drawing.

My device may be made of any size, and constructed of any materials and form found convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:—

1. In a fish elevator: a dam; a vertical fish passageway adjacent said dam; a gated opening at the bottom of said passageway for the passage of fish therethrough; a gated opening at the top of said passageway adapted for the passage of fish therethrough over said dam; and mechanism for simultaneously opening one of said gated openings and closing the other of said gated openings for the purpose of affecting the level of water within said vertical fish passageway and thus allowing passage of fish over said dam.

2. In a fish elevator: a dam; a vertical fish passageway adjacent said dam; a gated opening at the bottom of said passageway for the passage of fish therethrough; a gated opening at the top of said passageway for the passage of fish therethrough over said dam; mechanism for simultaneously opening one of said gated opening and closing the other thereof for the purpose of affecting the level of water within said passageway and thus allowing the passage of fish over said dam; and a gratelike basket within said passageway supported by floats for the purpose of keeping fish near the surface of the water within said passageway and thus adjacent said upper gated opening over said dam.

3. In a fish elevator: a vertical hollow casing; openings at each end of said casing for the passage of fish therethrough; gates to control the flow of water through said openings; and mechanism to simultaneously operate said gates for the purpose of affecting the level of water within said casing and the passage of fish therethrough.

4. In a fish elevator: a vertical hollow casing adapted to receive fish therein; means to vary the volume of water within said casing for the purpose of raising or lowering fish contained therein; and a float supported grate within said casing for the purpose of confining fish near the surface of the water within said casing.

JAMES R. WHEELER.